United States Patent

Tomita et al.

[11] Patent Number: 5,632,807
[45] Date of Patent: May 27, 1997

[54] DEVICE FOR THE SEPARATION OF ELEMENTS OF A GAS MIXTURE BY ADSORPTION

[75] Inventors: Shinji Tomita; Shuichi Muruyama, both of Hyogo-gen, Japan; Marc Wagner, Saint-Maur, France

[73] Assignee: L'Air Liquide, Societe Anonyme pour l'Etude et l'Exploitation des Procedes Georges Claude, Paris Cedex, France

[21] Appl. No.: 374,615

[22] PCT Filed: Jun. 2, 1994

[86] PCT No.: PCT/FR94/00645

§ 371 Date: Feb. 28, 1995

§ 102(e) Date: Feb. 28, 1995

[87] PCT Pub. No.: WO94/29000

PCT Pub. Date: Dec. 22, 1994

[30] Foreign Application Priority Data

Jun. 3, 1993 [JP] Japan .................................. 5-156363

[51] Int. Cl.$^6$ ................................................ B01D 53/04
[52] U.S. Cl. .................. 96/131; 96/133; 96/144; 96/151
[58] Field of Search ................ 96/108, 130–133, 96/136, 143, 144, 151

[56] References Cited

U.S. PATENT DOCUMENTS

| 2,428,885 | 10/1947 | Luáces | 96/130 X |
|---|---|---|---|
| 2,626,675 | 1/1953 | Maher | 96/144 |
| 2,951,551 | 9/1960 | West | 96/133 |
| 3,338,030 | 8/1967 | Feldbauer, Jr. | 95/103 |
| 3,942,960 | 3/1976 | Girard | 96/130 X |
| 4,155,849 | 5/1979 | Baierl | 96/131 X |
| 4,448,592 | 5/1984 | Linde | 96/130 X |
| 4,544,384 | 10/1985 | Metschl et al. | 96/130 |
| 4,698,072 | 10/1987 | Rohde et al. | 96/131 X |
| 5,071,449 | 12/1991 | Sircar | 95/98 |
| 5,137,548 | 8/1992 | Gremnier et al. | 95/41 |
| 5,169,607 | 12/1992 | Krambrock et al. | 96/131 X |
| 5,223,004 | 6/1993 | Etéve et al. | 55/26 |
| 5,232,479 | 8/1993 | Poteau et al. | 96/131 |

FOREIGN PATENT DOCUMENTS

| 04 486 926 | 5/1992 | European Pat. Off. | |
| 2175569 | 10/1973 | France. | |
| 832600 | 2/1952 | Germany. | |
| 2624482 | 12/1977 | Germany | 96/133 |
| 60-137431 | 7/1985 | Japan | 96/131 |
| 62-007416 | 1/1987 | Japan | 96/132 |
| 05-192529 | 8/1993 | Japan | 96/108 |
| 1459785 | 12/1976 | United Kingdom | 96/133 |
| 1489986 | 10/1977 | United Kingdom | 96/130 |

Primary Examiner—Robert Sptizer
Attorney, Agent, or Firm—Young & Thompson

[57] ABSTRACT

A device for separating at least one component from a gas mixture, comprising at least a pair of adsorber units, each adsorber unit comprising an envelope defining an inner volume having a lower end zone and an upper end zone. There is at least one adsorbent layer between the lower and upper end zones. A first conduit has one end communicating with the lower end zone, and a second conduit has one end communicating with the upper end zone. The adsorber units of the pairs are superposed and one of the first and second conduits of each adsorber includes a vertical central tube portion. The vertical central tube portions of the pair of adsorber units are mechanically interconnected in endwise abutting relationship. The adsorber units are superposed such that the envelopes of adjacent units leave an intermediate space therebetween. The first and second conduits each have an outer portion extending out of the envelope in the intermediate space.

12 Claims, 2 Drawing Sheets

DEVICE FOR THE SEPARATION OF ELEMENTS OF A GAS MIXTURE BY ADSORPTION

The present invention relates to devices for the separation of elements of a gas mixture, of the type comprising at least two adsorbers each defining an internal volume having a lower end zone and an upper end zone and means for bringing the upper and lower end zones of the adsorbers into selective communication with fluid circuits.

Separation devices of this type are essentially used, in pressure or temperature variation technologies called PSA or TSA, for the production, starting with a gas mixture, of a gaseous constituent of this mixture, especially of a constituent of air, oxygen or nitrogen, or for the purification of a gas mixture, especially of feed air for a cryogenic air separation unit, also for the production of a constituent of air, oxygen and/or nitrogen and/or argon, and generally employ at least one of the adsorbents chosen from the group comprising zeolites, activated carbon, alumina or silica gels. Examples of these technologies are described especially in the documents U.S. Pat. No. 5,223,004, EP-092,153, U.S. Pat. No. 3,338,030 or U.S. Pat. No. 5,137,548. In the known devices, generally comprising two to four adsorbers, the latter are arranged vertically one beside the other, in a battery, with much pipework provided with valving, connecting the lower and upper parts of the various adsorbers to the fluid circuits. In addition, in applications employing the alternation of hot and cold gases, the adsorbers, which in practice are not thermally insulated, have to be arranged at a certain horizontal distance away from each other.

The object of the present invention is to propose a device for separation by adsorption having a particularly compact and closely-built configuration and being suitable for various applications.

In order to do this, according to one characteristic of the invention, the adsorbers are superposed.

According to other characteristics of the invention:
— the means for bringing into communication with the fluid circuits comprise, for each adsorber, a vertical central tube having one end communicating with a lower or upper end zone of the internal volume and the other end of which is connected to one of the said fluid circuits;
— the central tubes are mechanically connected to each other and to the vertically opposed end walls of the device.

The present invention also relates to the applications of such devices for the production, by separation, of a constituent of a gas mixture, especially of hydrogen from a gas mixture containing hydrogen, of oxygen or of nitrogen from air, or, for the purification in terms of oxides of carbon and in terms of water, of air delivered to a cryogenic air separation unit.

Other characteristics and advantages of the present invention will emerge from the following description of embodiments given by way of illustration but in no way limiting, given in relation with the appended drawings in which.

In the description which will follow, and in the drawings, identical or similar elements bear the same reference numbers, possibly with. indices.

Figure 1:
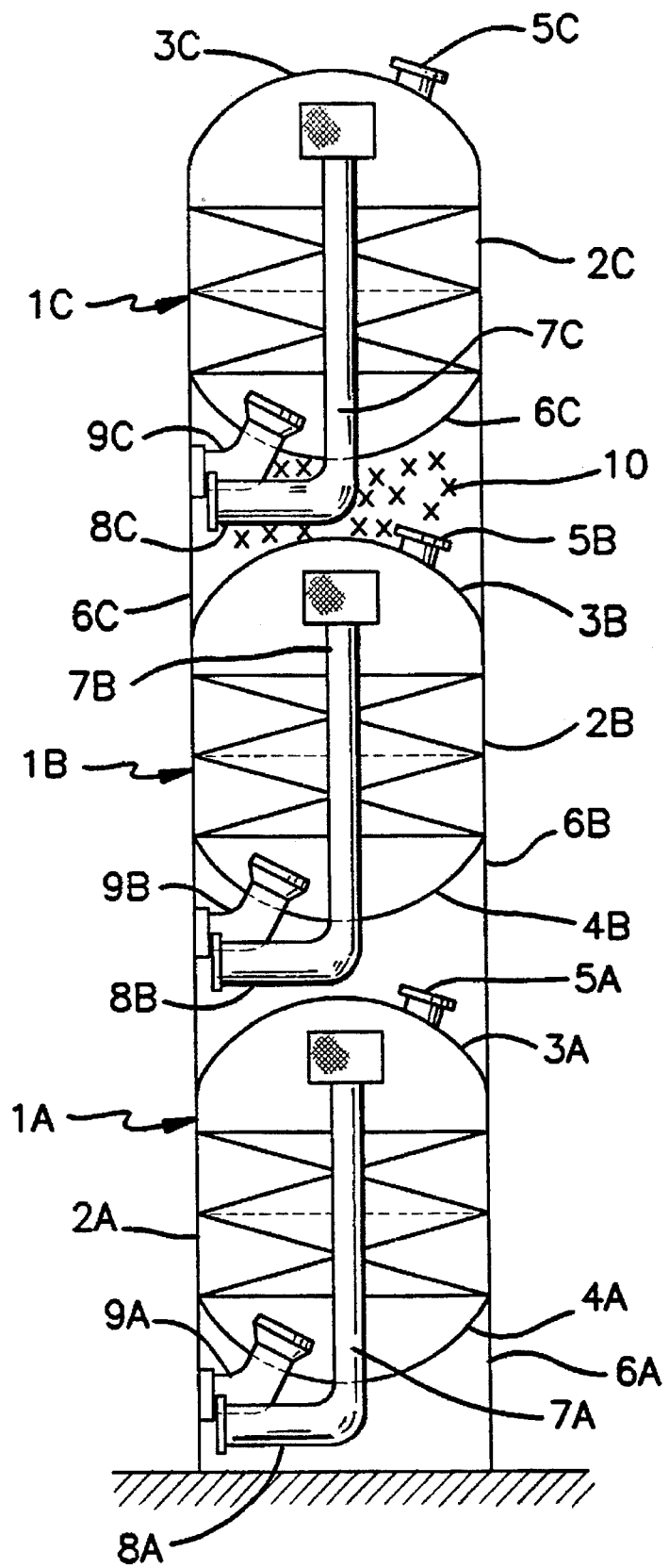
FIG. 1 is a diagrammatic view in vertical section of a first embodiment of a device according to the invention.

In the embodiment of FIG. 1, the device includes three identical superposed adsorbers 1A, 1B, 1C, each consisting of a peripheral cylindrical wall 2A, 2B, 2C and of transverse end walls in the form of upper 3A, 3B, 3C and lower $4_1$, 4A, 4B, 4C cupolas. The upper cupola 3A, 3B, 3C typically includes an opening 5A, 5B, 5C for filling with the adsorber in order to form therein at least one bed of adsorbent. The adsorbers are connected to each other by cylindrical skirts 6C and 6B surrounding a space between the adjacent adsorbers, the assembly being supported on a lower skirt 6A integral with the lower adsorber 1A. In the embodiment shown, each adsorber includes a vertical coaxial central tube 7A, 7B, 7C emerging into the upper zone of the internal volume of each adsorber and passing through the lower bottom 4A, 4B, 4C of the adsorber in order to be prolonged in a horizontal section of piping 8A, 8B, 8C extending into the space beneath each adsorber for the connection to a fluid circuit. Each adsorber also includes a tube 9A, 9B, 9C passing through the lower wall and emerging into the lower zone of each adsorber, also for connection to a fluid circuit.

As my be easily seen in FIG. 1, the superposed arrangement of the adsorbers and the concentric construction of the tubes 7A, 7B, 7C enables the floor-space requirement of the device to be considerably reduced and greatly facilitates its installation on production or utilization sites. In addition, in this vertical arrangement, it is the small surfaces (rounded ends) of the adsorbers which are neighboring, thereby enabling thermal interference between two adjacent adsorbers to be reduced. Furthermore, this interference may easily be virtually eliminated by arranging, in the connecting skirts 6B and 6C, at least one thermally insulating material, as shown at 10 in the figure.

Figure 2:
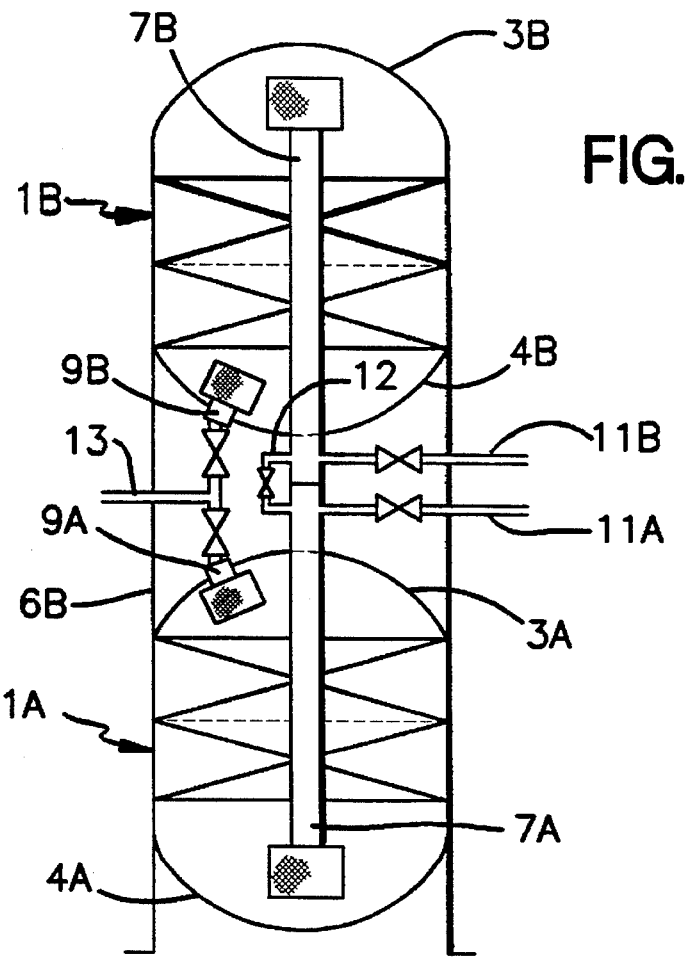
FIG. 2 is a diagrammatic view in vertical section of a second embodiment of the invention.

A greater compactness and an even more effective reduction in the thermal interference, even without insulation, between two adsorbers is obtained with the embodiment shown in FIG. 2. In this embodiment having two adsorbers 1A and 1B, the two central tubes 7A and 7B are mechanically coupled to each other in the space defined in the skirt 6B between the facing domed bottoms 3A and 4B and emerge respectively into the lower zone of the lower adsorber 1A and into the upper zone of the upper adsorber 1B. Each tube 7A, 7B communicates, via a valve, with a nozzle pipe 11A, 11B for connection to the fluid circuits and to each other via a by-pass nozzle pipe 12 equipped with a valve. In a symmetrical manner, the nozzle pipe 9B, which communicates with the lower zone of the upper adsorber, and the nozzle pipe 9A, which here passes through the upper wall 3A of the lower adsorber 1A in order to communicate with the upper zone of the latter, communicate, via valves, with a common nozzle pipe 13 for connection to the fluid circuit.

Figure 3:
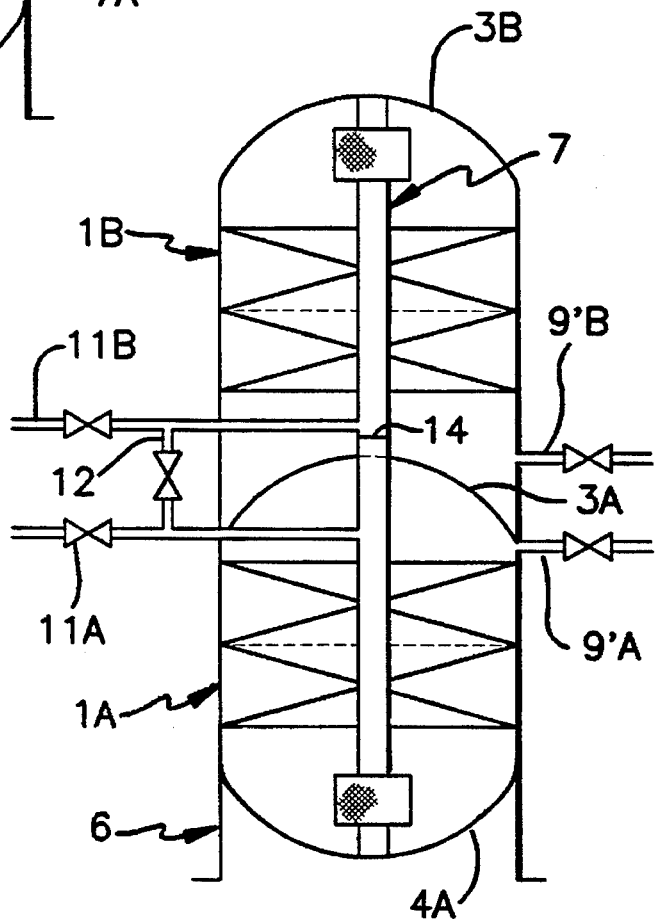
FIG. 3 is a diagrammatic view in vertical section of a third embodiment of a device according to the invention.

The embodiment of FIG. 3, making use of the symmetrical arrangement of the adsorber beds rendering pointless the construction of a thermal insulation between the two adsorbers, uses a single central tube 7, the ends of which are connected to the opposed end walls 3B and 4A of the upper 1B and lower 1A beds, the upper bed 1B being without a lower wall (4B), corresponding to the lower wall 4B in FIG. 2, the separation from the lower bed 1A being provided by the domed upper wall 3A of the lower bed 1A. In this embodiment, the peripheral walls 2A and 2B and the skirts 6A and 6B of the embodiment of FIG. 2 are replaced by a single shell 6. The tube 7, the opposite ends of which still communicate with the opposite end zones of the adsorbers 1A and 1B, is closed off centrally by a wall 14, the by-pass pipe 12 being, here, advantageously provided directly between the nozzle pipes 11A and 11B. In this embodiment, the other tubes 9'A and 9'B communicate respectively with the upper and lower parts of the lower 1A and upper 1B adsorbers through the shell 6. The embodiment of FIG. 3 has greater compactness and increased rigidity, the traversing tube 7 making it possible to take up the compressive forces on the opposed walls 4A, 3B of the adsorbers and thus being suitable for applications employing high pressures.

Although the present invention has been described in relation to particular embodiments, it is not limited thereby but, on the contrary, is capable of modifications and of variations which will be apparent to the person skilled in the art.

We claim:

1. A device for separating at least one component from a gas mixture, comprising at least a pair of adsorber units, each adsorber unit comprising an envelope defining an inner volume having a lower end zone and an upper end zone, at least one adsorbent layer between the lower and upper end zones, a first conduit means having one end communicating with the lower end zone, and a second conduit means having one end communicating with the upper end zone, wherein the adsorber units of the pairs are superposed and one of the first and second conduit means of each adsorber includes a vertical central tube portion, the vertical central tube portions of the pair of adsorber units being mechanically interconnected in endwise abutting relationship.

2. The device of claim 1, wherein the first and second conduit means each include valve means.

3. The device of claim 2, wherein the adsorber units are superposed so as to define an intermediate space between them and wherein at least part of the valve means are disposed in the intermediate space.

4. The device of claim 3, wherein the intermediate space is at least part filled with an insulating material.

5. The device of claim 1, wherein the vertical central tube portions are part of the second conduit means.

6. The device of claim 1, wherein the vertical central tube portions of the absorber units of the pair are formed from a single tube.

7. A gas separation device, comprising at least two adsorber units each comprising an envelope defining an inner volume having a lower end zone and an upper end zone, at least one layer of particulate material between the lower and upper end zones, a first conduit means including a vertical tube having one end opening into the upper end zone; a second conduit means having one end opening into the lower end zone, the adsorber units being superposed such that the envelopes of adjacent units leave an intermediate space therebetween, the first and second conduit means each having an outer portion extending out of the envelope in the intermediate space.

8. The device of claim 7, wherein the intermediate space is at least partly filled with an insulating material.

9. The device of claim 7, wherein the outer portion of the conduit means includes at least one valve.

10. The device of claim 7, comprising a common supporting cylindrical casing.

11. The device of claim 10, comprising at least three superposed absorber units, the cylindrical casing forming a peripheral part of each envelope.

12. The device of claim 7, wherein said vertical tube extends through the associated said layer of particulate material.

* * * * *